United States Patent [19]
Levitan

[11] Patent Number: 5,280,497
[45] Date of Patent: Jan. 18, 1994

[54] COMMUNICATING ON WANDERING CHANNELS

[76] Inventor: Gutman Levitan, 140 Van Cortland Ave. West, Bronx, N.Y. 10463

[21] Appl. No.: 706,168

[22] Filed: May 28, 1991

Related U.S. Application Data

[63] Continuation of Ser. No. 355,452, May 22, 1989, abandoned.

[51] Int. Cl.⁵ .................................................. H04L 27/30
[52] U.S. Cl. .............................................. 375/1; 380/34
[58] Field of Search ...................... 370/57, 58.1, 69.1, 370/77, 107

[56] References Cited

U.S. PATENT DOCUMENTS

| | | | |
|---|---|---|---|
| 2,405,991 | 8/1946 | Beverage et al. | 380/33 |
| 3,881,099 | 4/1975 | Ailett et al. | 370/77 X |
| 4,245,341 | 1/1981 | Hoffman et al. | 370/107 X |
| 4,700,341 | 10/1987 | Huang | 370/80 |
| 4,755,987 | 7/1988 | Lee et al. | 370/77 |
| 4,771,420 | 9/1988 | Deschaine et al. | 370/58.1 X |

Primary Examiner—Bernarr E. Gregory
Attorney, Agent, or Firm—Ilya Zborovsky

[57] ABSTRACT

For protection of communication against interception by frequent pseudorandom changing of the distribution of transmissions on channels, an input distributive switch is installed before the channel division device of a transmitting system and a similar output switch is installed after the channel division device of a receiving system. The distributive switches are controlled by synchronized pseudorandom generators and while the input switch repeatedly changes the distribution of transmissions on channels, and thereby channel of each transmission, the output switch directs all signals of each transmission to a fixed circuit defined for reception of that transmission.

2 Claims, 3 Drawing Sheets

COMMUNICATING ON WANDERING CHANNELS

CROSS REFERENCE TO RELATED APPLICATION

This application is a continuation of Ser. No. 07/355,452 of May 22, 1989, now abandoned.

BACKGROUND OF THE INVENTION

The present invention deals with protection of a transmission against unauthorized reception.

There are three ways to protect a transmission against unauthorized reception: changing data to be transmitted, changing signals and changing channels. The first way is known as encrypton, the second and the third are utilized in spread-spectrum radio communication. The two main spread-spectrum techniques are direct-sequence spectrum spreading and frequency hopping. In frequency hopping, the transmitter repeatedly changes the center or carrier frequency, which is a radio channel. All three ways of protecting communications often involve generation of a pseudo-random succession, that appears random while it is determined by a secret key. That makes a difference between an intended receiver provided with the key, and unintended one. A problem of frequency hopping is interference harmful for quality communication, especially for television and computers.

This invention relates to protection of multichannel systems such as telephone, cable TV, computer and multimedia networks. The systems may divide channels using frequency-division, time-division, code-division or wavelength-division, and transmit analog or digital signals by land using telephone cables or fiber optics, or through the atmosphere using microwave relay stations or satellite. The method of this invention consists in frequent changing of the distribution of transmissions on channels with a switch controlled by a pseudo-random generator. As a result, every transmission is wandering from channel to channel in a pseudo-random manner. This way of protection does not require additional channels and completely excludes mutual interference of transmissions. The method ensures a reliable protection by itself and gives a synergetic effect in combination with encryption because it makes the transmitted ciphertext inaccessible for attack.

SUMMARY OF THE INVENTION

An object of the invention is to protect communication against interception by frequent pseudorandom changing of the distribution of transmissions on channels. In keeping with these objects and with others which will become apparent hereinafter, an apparatus formed as a pseudorandom distributive switch is installed before the channel division device of a transmitting system to changeably distribute signals of different transmissions among different channels and thereby to repeatedly change channel of each transmission during a communication session. It consists of a conventional distributive switch, a computing device to produce different distributions of transmissions on channels and to output them in a pseudorandom order, and a means for converting signals of the computing device into signals fed to control circuits of the distributive switch.

In accordance with another feature of the present invention an apparatus for assembling signals of transmissions transmitted on pseudorandomly changing channels, is a pseudorandom distributive switch installed after the channel division device of a receiving system to direct all signals of each transmission to a fixed circuit defined for reception of that transmission. It consists of a distributive switch to changeably distribute signals of different channels among different circuits defined for reception of certain transmissions, a computing device to produce and output necessary distributions, and a means for converting signals of the computing device into signals that controls the distributive switch.

The invention can protect transmissions between nonterminal nodes of a network and transmissions to and from terminals, such as TV sets, telephones or computers.

BRIEF DESCRIPTION OF THE DRAWING FIGURES

DETAILED DESCRIPTION OF THE PREFERRED EMBODIMENTS

Figure 1:
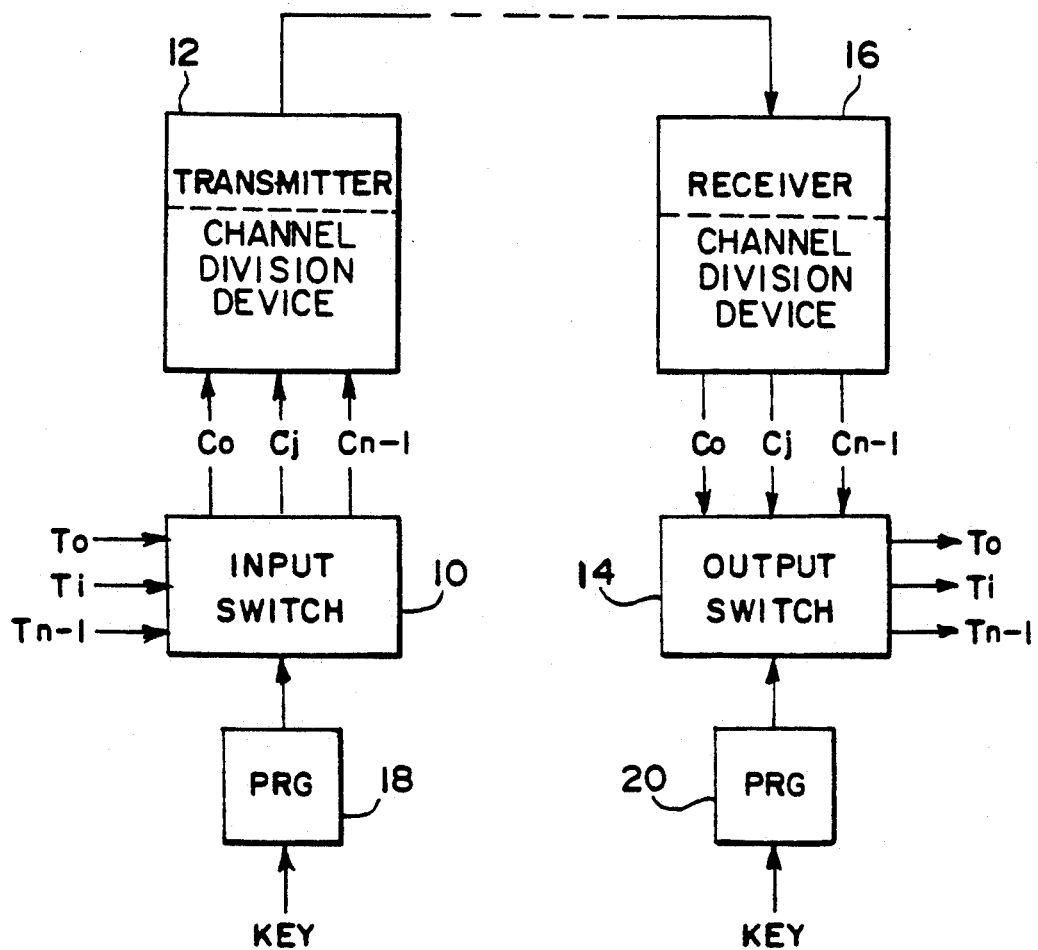
FIG. 1 is a block diagram of the system for communicating on wandering channels.

Communicating on wandering channels is implemented in any multichannel transmitting system by installation of an input distributive switch 10 coupled with a pseudorandom generator 18 before the channel division device of a transmitter 12, and a similar output switch 14 coupled with a pseudorandom generator 20, after the channel division device of a receiver 16 (FIG. 1). The switch 10 distributes signals of transmissions $t_0, \ldots, T_{n-1}$ fed to the switch inputs among different channels $C_0, \ldots, C_{n-1}$ to which the switch outputs are connected, and changes the distribution, and thereby channel of each transmission, whenever signals fed to the switch control circuits are changed. The pseudorandom generator 18, which will be described hereafter, produces different distributions of transmissions on channels and outputs them in a pseudorandom order determined by a pseudorandom succession of numbers which, in turn, is determined by a secret key.

Whatever is the way to divide channels in the system, frequency-division, time-division or code-division, the transmitter 12, the receiver 16 and all intermediate devices, if any, operate in a usual way because it doesn't matter whether signals transmitted by a channel belong to the same transmission or to different ones. Meanwhile any eavesdropping device which is not provided with the same key that is used in the generator 18 at the sending end is not able to follow any of the transmissions $T_0, \ldots, T_{n-1}$ wandering from channel to channel during communication session. At the receiving end a pseudo-random generator 20, which will be described hereafter, is provided with that key and thus it is able to produce and output necessary distributions for directing all signals of each transmission from different channels to a fixed circuit defined for reception of that transmission.

Figure 2:
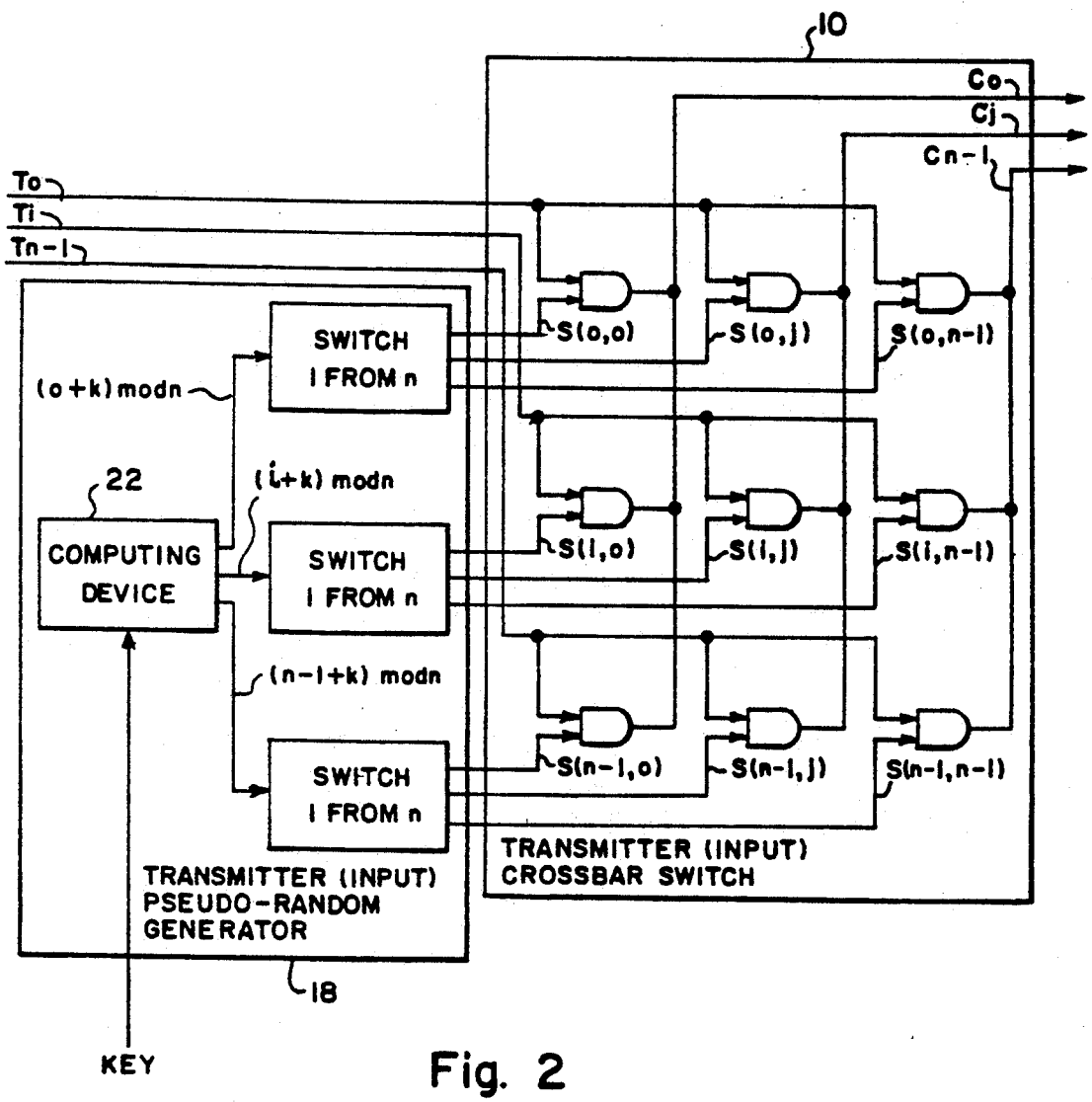
FIG. 2 is a block diagram of the transmitter pseudorandom generator and distributive switch.
Figure 3:
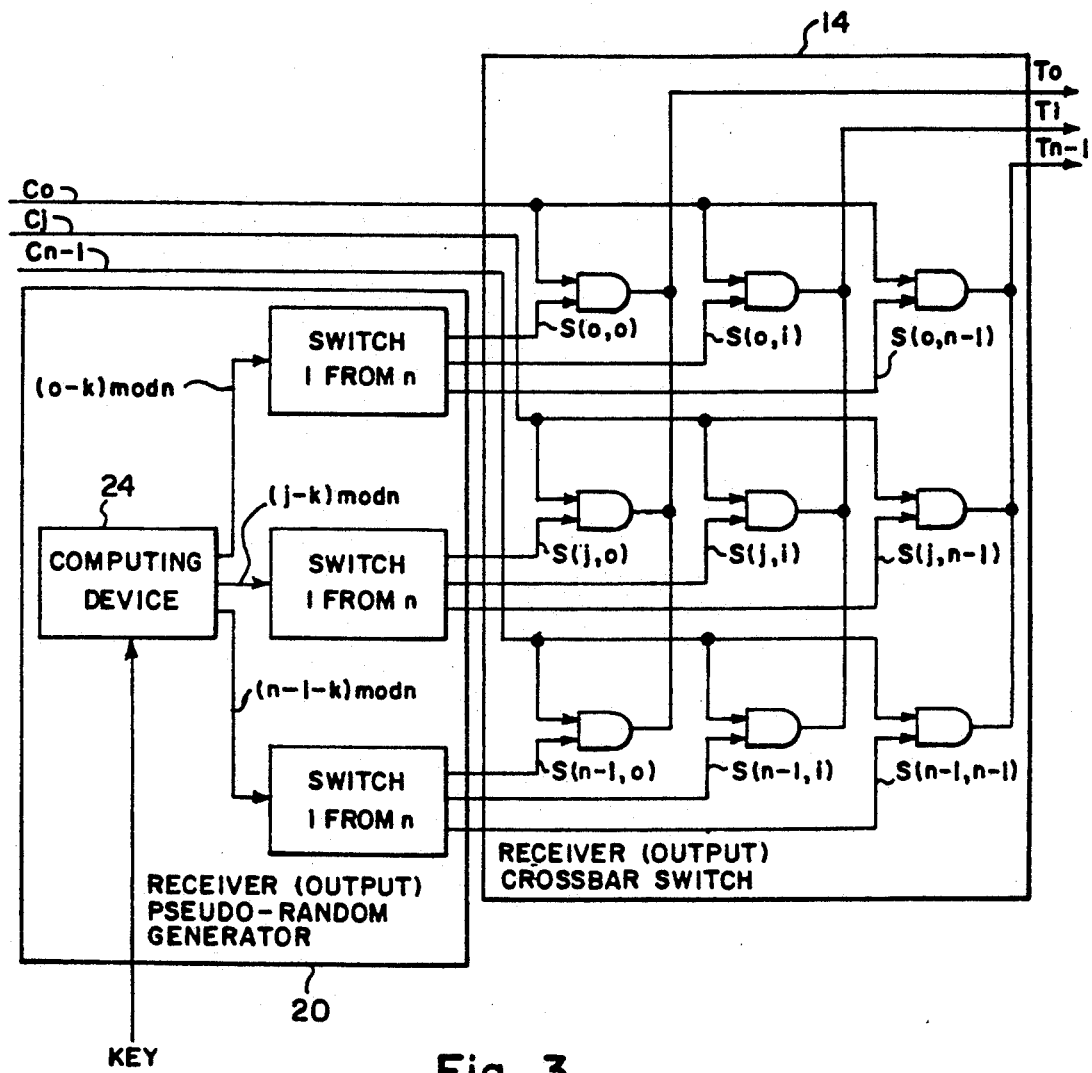
FIG. 3 is a block diagram of the receiver pseudorandom generator and distributive switch.

The transmitter distributive (crossbar) switch 10 (FIG. 2) is a network of input and output bars with AND-gates in its nodes. The signals of transmissions $T_0, \ldots, T_{n-1}$ are fed to the input bars while the output bars are connected to the channels $C_0, \ldots, C_{n-1}$ of the transmitter 12. Under any combination of control signals produced by the pseudorandom generator 18 only one of the AND-gates connected to each input bar and only one of the AND-gates connected to each output bar are opened while all other AND-gates are closed. That provides one channel for every transmission in each distribution. The output crossbar switch 14 (FIG. 3) is also a network of input and output bars with AND-gates in its nodes. The circuits of receiver which are outputs of the channels $C_0, \ldots, C_{n-1}$ are connected to the input bars of the switch while the output bars are connected to circuits defined for reception of certain transmissions.

The pseudo-random generators 18 and 20 at both the sending and receiving ends (FIG. 2 and 3) consist of computing devices 22 and 24 and switches of the type "1 from n". Such switches are well known in digital electronics. Every switch controls a line of AND-gates connected to an input bar of distributive switch. It receives from the computing device a code of a number in the range 0 to $n-1$, opens the AND-gate that corresponds to that number and keeps closed all other AND-gates of the line, and thus it chooses an output bar for signals fed to the input bar.

The computing devices in both generators produce the same pseudo-random succession of values of a variable k. The computing device 22 of the generator 18 at the sending end defines a channel $C_j$ for a transmission $T_i$ as follows:

$$j = (i+k) \bmod n$$

which means the same as:

$$j = \begin{cases} i+k & \text{if } i+k < n \\ i+k-n & \text{if } i+k \geq n \end{cases}$$

This is a way to generate n different distributions of n transmissions among n channels: one distribution for every value of k.

Table 1 shows the distributions in the case of $n=10$. When $k=0$ the distribution is "normal": transmission $T_0$ is transmitted on channel $C_0$, $T_1$ on $C_1$ and so on. In other distributions, all transmissions are circularly shifted on k positions. The point is, however, that the value of k is not changing in the succession $0, 1, \ldots, n-1$, then again $0, 1, \ldots$ and so on. Instead it is changing in a pseudorandom succession which looks like this:
0, 8, 3, 3, 7, ...

with no repetion. Therefore the channels of all transmissions are also changing in a pseudorandom manner like in Table 2 where, e.g. transmissions $T_5$ wanders from channel to channel in the succession $C_5, C_3, C_8, C_8, C_2, \ldots$ The computing device 24 of the generator 20 at the receiving end defines a system output $T_i$ for a channel $C_j$ as follows:

$$i = (j-k) \bmod n$$

which means the same as:

$$i = \begin{cases} j-k & \text{if } j \geq k \\ n+j-k & \text{if } j < k \end{cases}$$

As a result, the output distributive switch directs all signals of each transmission to a circuit defined for reception of that transmission. For example, if the pseudorandom succession in both the transmitter and receiver generators is k: 0, 8, 3, 3, 7, ...

the transmission $T_5$ wanders from channel in the succession j: $C_5, C_3, C_8, C_8, C_2, \ldots$ and, at the receiving end, it is directed to the reception point i: $T_5, T_5, T_5, T_5, T_5, \ldots$ The described algorithm of pseudorandom redistribution of transmissions on channels is the simplest one: it only produces pseudorandom rows in Table 2, not columns. More sofisticated algorithms can be implemented in computing devices 22 and 24 to make pseudorandom both rows and columns, like in table 3, and thereby to ensure even better protection.

While certain novel features of this invention have been shown and described and are pointed out in the annexed claims, it will be understood that various omissions, substitutions and changes in the forms and details of the devices illustrated and their operation can be made by those skilled in the art without departing from the spirit of the invention.

TABLE 1

| Trans | Channels | | | | | |
|---|---|---|---|---|---|---|
| | 0 | 1 | 2 | 3 | 4 | ... |
| $T_0$ | $C_0$ | $C_1$ | $C_2$ | $C_3$ | $C_4$ | ... |
| $T_1$ | $C_1$ | $C_2$ | $C_3$ | $C_4$ | $C_5$ | ... |
| $T_2$ | $C_2$ | $C_3$ | $C_4$ | $C_5$ | $C_6$ | ... |
| $T_3$ | $C_3$ | $C_4$ | $C_5$ | $C_6$ | $C_7$ | ... |
| $T_4$ | $C_4$ | $C_5$ | $C_6$ | $C_7$ | $C_8$ | ... |
| $T_5$ | $C_5$ | $C_6$ | $C_7$ | $C_8$ | $C_9$ | ... |
| $T_6$ | $C_6$ | $C_7$ | $C_8$ | $C_9$ | $C_0$ | ... |
| $T_7$ | $C_7$ | $C_8$ | $C_9$ | $C_0$ | $C_1$ | ... |
| $T_8$ | $C_8$ | $C_9$ | $C_0$ | $C_1$ | $C_2$ | ... |
| $T_9$ | $C_9$ | $C_0$ | $C_1$ | $C_2$ | $C_3$ | ... |

TABLE 2

| Trans | Channels | | | | | |
|---|---|---|---|---|---|---|
| | 0 | 8 | 3 | 3 | 7 | ... |
| $T_0$ | $C_0$ | $C_8$ | $C_3$ | $C_3$ | $C_7$ | ... |
| $T_1$ | $C_1$ | $C_9$ | $C_4$ | $C_4$ | $C_8$ | ... |
| $T_2$ | $C_2$ | $C_0$ | $C_5$ | $C_5$ | $C_9$ | ... |
| $T_3$ | $C_3$ | $C_1$ | $C_6$ | $C_6$ | $C_0$ | ... |
| $T_4$ | $C_4$ | $C_2$ | $C_7$ | $C_7$ | $C_1$ | ... |
| $T_5$ | $C_5$ | $C_3$ | $C_8$ | $C_8$ | $C_2$ | ... |
| $T_6$ | $C_6$ | $C_4$ | $C_9$ | $C_9$ | $C_3$ | ... |
| $T_7$ | $C_7$ | $C_5$ | $C_0$ | $C_0$ | $C_4$ | ... |
| $T_8$ | $C_8$ | $C_6$ | $C_1$ | $C_1$ | $C_5$ | ... |
| $T_9$ | $C_9$ | $C_7$ | $C_2$ | $C_2$ | $C_6$ | ... |

TABLE 3

| Trans | Channels | | | | | |
|---|---|---|---|---|---|---|
| | 0 | 8 | 3 | 3 | 7 | ... |
| $T_0$ | $C_7$ | $C_5$ | $C_6$ | $C_0$ | $C_0$ | ... |
| $T_1$ | $C_4$ | $C_2$ | $C_9$ | $C_7$ | $C_3$ | ... |
| $T_2$ | $C_5$ | $C_3$ | $C_5$ | $C_8$ | $C_9$ | ... |
| $T_3$ | $C_9$ | $C_7$ | $C_8$ | $C_2$ | $C_2$ | ... |
| $T_4$ | $C_2$ | $C_0$ | $C_1$ | $C_5$ | $C_5$ | ... |
| $T_5$ | $C_6$ | $C_4$ | $C_7$ | $C_9$ | $C_1$ | ... |
| $T_6$ | $C_1$ | $C_9$ | $C_3$ | $C_4$ | $C_7$ | ... |
| $T_7$ | $C_3$ | $C_1$ | $C_4$ | $C_6$ | $C_8$ | ... |
| $T_8$ | $C_8$ | $C_6$ | $C_0$ | $C_1$ | $C_4$ | ... |
| $T_9$ | $C_0$ | $C_8$ | $C_2$ | $C_3$ | $C_6$ | ... |

I claim:

1. A transmitting system comprising:

a transmitter with a channel division device;

a distributive switch having a plurality of inputs, a plurality of outputs and a plurality of control circuits that direct passage of signals from the inputs to the outputs, said distributive switch being installed before and connected with the channel division device of said transmitter to distribute signals of different transmissions fed to the switch inputs among different channels to which the switch outputs are connected, and to change a distribution and thereby a channel of each transmission whenever signals fed to the switch control circuits are changed;

a computing device operative to produce different distributions of transmissions on the channels by changeably associating said distributive switch inputs and outputs so to provide a separate channel for every transmission in each distribution, and to output the distributions in a pseudorandom order determined by a pseudorandom succession of numbers; and means for converting signals representing data produced by said computing device into signals fed to the control circuits of said distributive switch thereby providing passage of signals from each switch input to an output currently associated with the input.

2. A receiving system for reception of transmissions transmitted on pseudorandomly changing channels, comprising:

a receiver with a channel division device;

a distributive switch having a plurality of inputs, a plurality of outputs and a plurality of control circuits that direct passage of signals from the inputs to the outputs, said distributive switch being installed after and connected with the channel division device of said receiver to changeably distribute signals of different channels to which said switch inputs are connected among different circuits connected to said switch outputs and defined in the receiving system as points to which certain transmissions have to be directed;

a computing device operative to produce changeable associations of said switch inputs and outputs that cause directing of all signals of each transmission to a fixed circuit defined for reception of the transmission; and means for converting signals representing data produced by said computing device into signals fed to the control circuits of said distributive switch thereby providing passage of signals from each switch input to an output currently associated with the input.

* * * * *